(12) United States Patent
Narumiya et al.

(10) Patent No.: US 10,584,783 B2
(45) Date of Patent: Mar. 10, 2020

(54) HIGH-STRENGTH GEAR

(71) Applicant: NIPPON STEEL & SUMITOMO METAL CORPORATION, Tokyo (JP)

(72) Inventors: Hiroki Narumiya, Tokyo (JP); Osamu Kada, Tokyo (JP); Takashi Fujita, Tokyo (JP); Yutaka Neishi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 135 days.

(21) Appl. No.: 15/560,461

(22) PCT Filed: Mar. 29, 2016

(86) PCT No.: PCT/JP2016/060224
§ 371 (c)(1),
(2) Date: Sep. 21, 2017

(87) PCT Pub. No.: WO2016/158995
PCT Pub. Date: Oct. 6, 2016

(65) Prior Publication Data
US 2018/0073618 A1 Mar. 15, 2018

(30) Foreign Application Priority Data
Mar. 30, 2015 (JP) .................................. 2015-070000

(51) Int. Cl.
*F16H 55/08* (2006.01)

(52) U.S. Cl.
CPC ......... *F16H 55/08* (2013.01); *F16H 55/0806* (2013.01)

(58) Field of Classification Search
CPC .............................. F16H 55/08; F16H 55/0806
(Continued)

(56) References Cited

U.S. PATENT DOCUMENTS 4,051,745 A * 10/1977 Ishikawa ............. F16H 55/0826
74/462
7,051,745 B2 * 5/2006 Carter ..................... E04H 15/50
135/131

(Continued)

FOREIGN PATENT DOCUMENTS

| JP | 2010-281441 A | 12/2010 |
| JP | 5520374 B2 | 4/2014 |
| JP | 2015-1248 A | 1/2015 |

*Primary Examiner* — Victor L MacArthur
*Assistant Examiner* — Gregory Robert Weber
(74) *Attorney, Agent, or Firm* — Birch, Stewart, Kolasch & Birch, LLP

(57) ABSTRACT

A gear keeping the bending stress at the dedendum from becoming locally high at the time of power transmission and thereby raising the dedendum bending strength. The radius of curvature is maximum at a critical section position determined by the Hofer's 30° tangent method. Both radii of curvature from the critical section position to the first and second connecting points X1 and Y1 are constant or decreasing. In dedendum line segment 23, there are points A1 and B1 where radius of curvature is smaller than the critical section position. In the dedendum line segment 23, the maximum radius of curvature is 3 times or less the minimum radius of curvature. By a cross-sectional view, the critical section position is part of an arc, and the arc extends to the two sides of the critical section position. Thus, the maximum bending stress becomes smaller and dedendum bending strength is improved.

4 Claims, 4 Drawing Sheets

(58) Field of Classification Search
USPC .......................................................... 74/462
See application file for complete search history.

(56) References Cited

U.S. PATENT DOCUMENTS

| | | | | |
|---|---|---|---|---|
| 7,950,305 | B2* | 5/2011 | Gutmann | ................ F16H 55/08 |
| | | | | 74/457 |
| 8,100,028 | B2* | 1/2012 | Miyaoku | ................ F16H 55/08 |
| | | | | 74/462 |
| 9,109,691 | B2* | 8/2015 | Okamoto | ............ F16H 55/0806 |
| 2010/0132496 | A1 | 6/2010 | Okamoto | |
| 2011/0219898 | A1* | 9/2011 | Miura | ..................... F16H 55/17 |
| | | | | 74/458 |
| 2013/0091970 | A1 | 4/2013 | O-oka et al. | |
| 2014/0366668 | A1* | 12/2014 | Kajiwara | ............ F16H 55/0806 |
| | | | | 74/457 |

* cited by examiner

FIG. 1
CONVENTIONAL
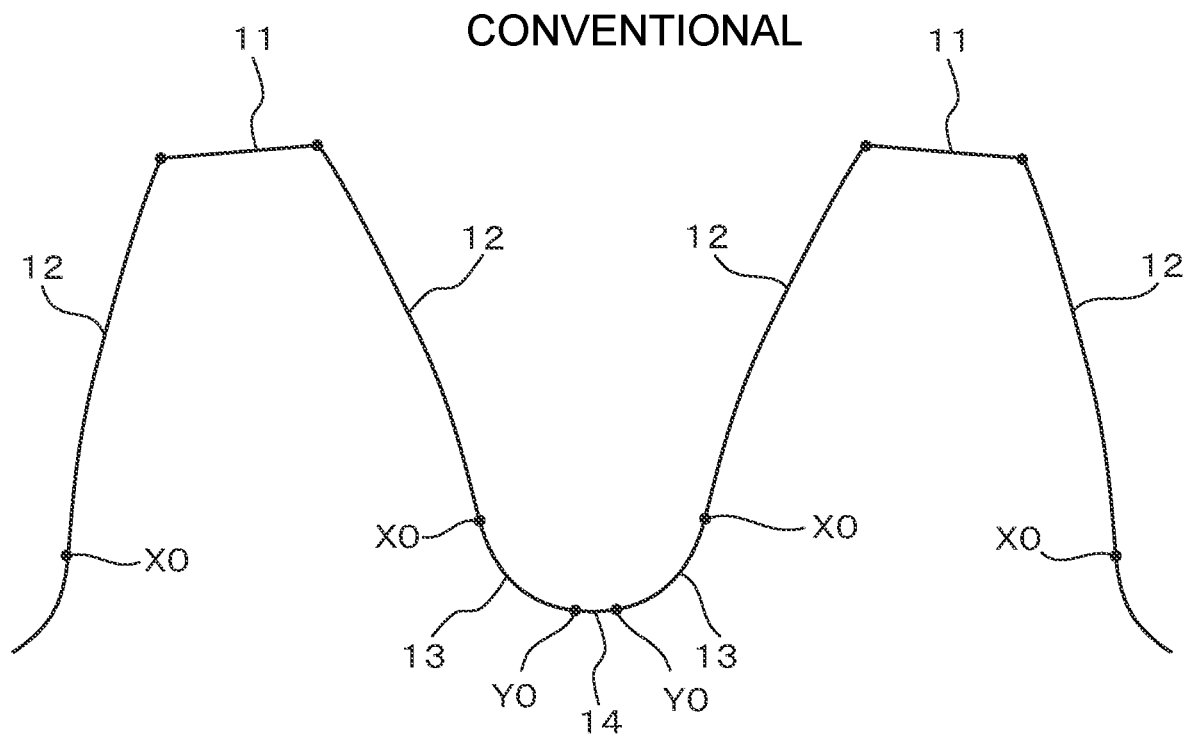

FIG. 3A
CONVENTIONAL
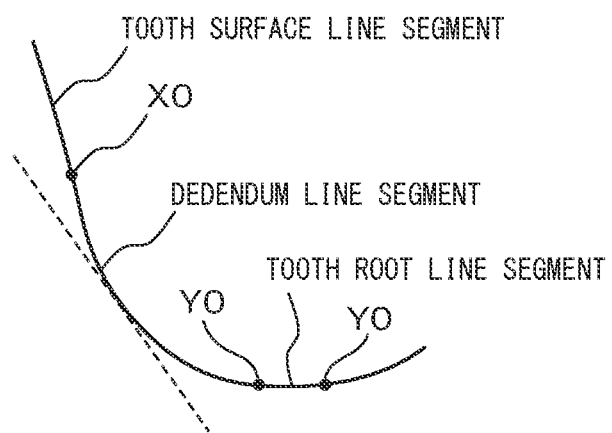
FIG. 3B
CONVENTIONAL
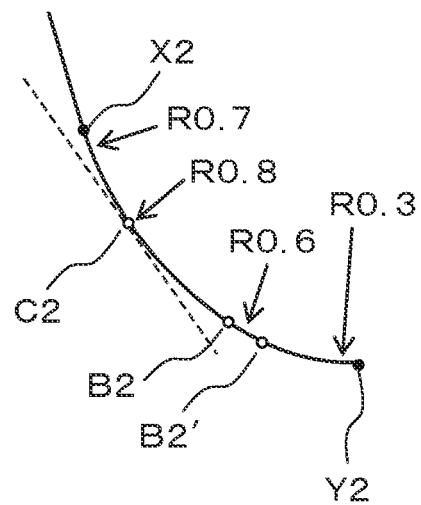

HIGH-STRENGTH GEAR

TECHNICAL FIELD

The present invention relates to a high strength gear having a dedendum profile enabling reduction of bending stress generated at a dedendum at the time of power transmission.

BACKGROUND ART

Gears are mechanical elements necessary and essential for industrial machines used in industry, agriculture, construction, etc. and for automobiles. These gears are used under tough conditions while subjected to high load, so the bending stress generated at a dedendum is liable to cause the tooth to break.

In the gear cutting process most generally used as the method of production of gears, the dedendum profile, which has a great effect on the dedendum bending strength, is unambiguously determined by the cutting edge profile of the gear cutting tool. Usually, the cutting edge of a gear cutting tool is made as rounded as possible for the purpose of raising the dedendum bending strength, but if excessively rounded, a detrimental effect ends up caused in the meshing of teeth at the time of use of the gears, so there are limits to the improvement of the dedendum bending strength by changing the cutting edge profile.

On the other hand, a gear fabricated by forging or powder metallurgy etc. enables free design of the dedendum profile to an extent not interfering with the addendum of the opposing gear and may enable the fabrication of a gear with a more excellent dedendum bending strength than even a gear fabricated by gear cutting Japanese Patent No. 5520374 (PLT 1) discloses a gear for transmission use produced by hot forging with a tooth root surface comprised of a free curve maximizing the minimum radius of curvature near the dedendum. According to PLT 1, by maximizing the minimum radius of curvature, it is considered that the concentration of stress is eased and the dedendum bending strength is improved.

Further, Japanese Patent Publication No. 2015-1248A (PLT 2) discloses a gear having, from a tooth root to a tooth surface, a first involute part, arc part, second involute part, third involute part, and tooth surface-connecting curve part. According to PLT 2, it is of course considered possible to make the amount of variation of stress in the so-called partially reversed state of tensile stress and compressive stress generated at a tooth root side region uniform and prevent a maximum stress amplitude position from occurring at the tooth root center or its vicinity and also to prevent the maximum stress amplitude position from occurring at the tooth root side region as a whole and possible to improve the durability of a tooth.

SUMMARY OF INVENTION

Technical Problem

However, in PLT 1, the position where the radius of curvature of the dedendum profile becomes the minimum is not clearly described. If comparing, by a cross-sectional view, the case where the position where the radius of curvature becomes the minimum is near the tooth root circle and the case where it is near a critical section position determined by the Hofer's 30° tangent method (below, sometimes simply referred to as the "critical section position"), even if the minimum radius of curvature is the same, the generated bending stress will greatly differ. That is, depending on the position where the radius of curvature becomes minimum, the dedendum bending strength is liable to be lower than even a gear fabricated by gear cutting Further, in PLT 2, the vicinity of the tooth root center is an involute curve with a changing radius of curvature, so there is a possibility of breakage at a point other than near the tooth root center where the curvature is maximum and the dedendum bending strength is liable to be unable to be sufficiently obtained.

The present invention was made in consideration of the above situation and has as its object the provision of a high strength gear reducing bending stress generated at a dedendum at the time of power transmission and realizing higher strength.

Solution to Problem

To solve the above problem, the inventors studied the profile of a dedendum line segment enabling reduction of bending stress occurring at a dedendum (part shown by above dedendum line segment) for a high strength gear having a tooth profile comprising, by cross-sectional view, an addendum line segment, tooth surface line segment, dedendum line segment, and tooth root line segment successively connected. As a result, they obtained the finding that, in particular for the dedendum line segment, by improving the relationship among the radius of curvature at a specific position (critical section position), the shape of the dedendum line segment itself, the radius of curvature at a position other than that specific position, the maximum radius of curvature, and the minimum radius of curvature, it is possible to reduce the bending stress generated at the dedendum and in turn obtain a high strength gear excellent in dedendum bending strength.

Further, the inventors obtained the finding that by further improving the tooth root line segment near the critical section position, it is possible to reduce the bending stress generated at the dedendum much more and in turn obtain a high strength gear more excellent in dedendum bending strength.

Based on the above findings, the inventors completed the invention. Its gist is as follows:

[1] A high strength gear having, in cross-sectional view, a tooth profile of an addendum line segment, a tooth surface line segment, a dedendum line segment, and a tooth root line segment successively connected, wherein a maximum radius of curvature is at a critical section position determined by a Hofer's 30° tangent method, a radius of curvature from the critical section position to a first connecting point of a boundary point of the tooth surface line segment and the dedendum line segment is constant or decreases, a radius of curvature from the critical section position to a second connecting point of a boundary point of the dedendum line segment and the tooth root line segment is constant or decreases, in the dedendum line segment, there is a point where the radius of curvature is smaller than the critical section position, in the dedendum line segment, a maximum radius of curvature is 3 times or less a minimum radius of curvature, the critical section position is part of an arc, and the arc extends to both sides of the critical section position.

[2] The high strength gear according to [1], wherein the arc extends in the addendum line segment direction and the dedendum line segment direction based on the critical section position by a tooth depth direction dimension of 0.05 time or more of the module.

[3] The gear according to [1] or [2], comprised of a ferrous alloy.

Advantageous Effects of Invention

In the high strength gear according to the present invention, the inventors improved the relationship among a radius of curvature at a specific position (critical section position), a profile of the dedendum line segment itself, the radius of curvature at a position other than that specific position, the maximum radius of curvature, and the minimum radius of curvature in particularly the shape of the dedendum line segment seen by a cross-sectional view. Further, in the high strength gear according to the present invention, furthermore, the tooth root line segment near the critical section position is improved. As a result, according to the high strength gear according to the present invention, it is possible to reduce the bending stress generated at the dedendum and in turn raise the dedendum bending strength.

BRIEF DESCRIPTION OF DRAWINGS

FIG. 1 is a view showing a conventional tooth profile line segment of a gear fabricated by gear cutting.

FIGS. 3A and 3B are views showing tooth profile line segments of different types of gears for comparison of the dedendum bending strength (conventional example).

DESCRIPTION OF EMBODIMENTS

Figure 2:
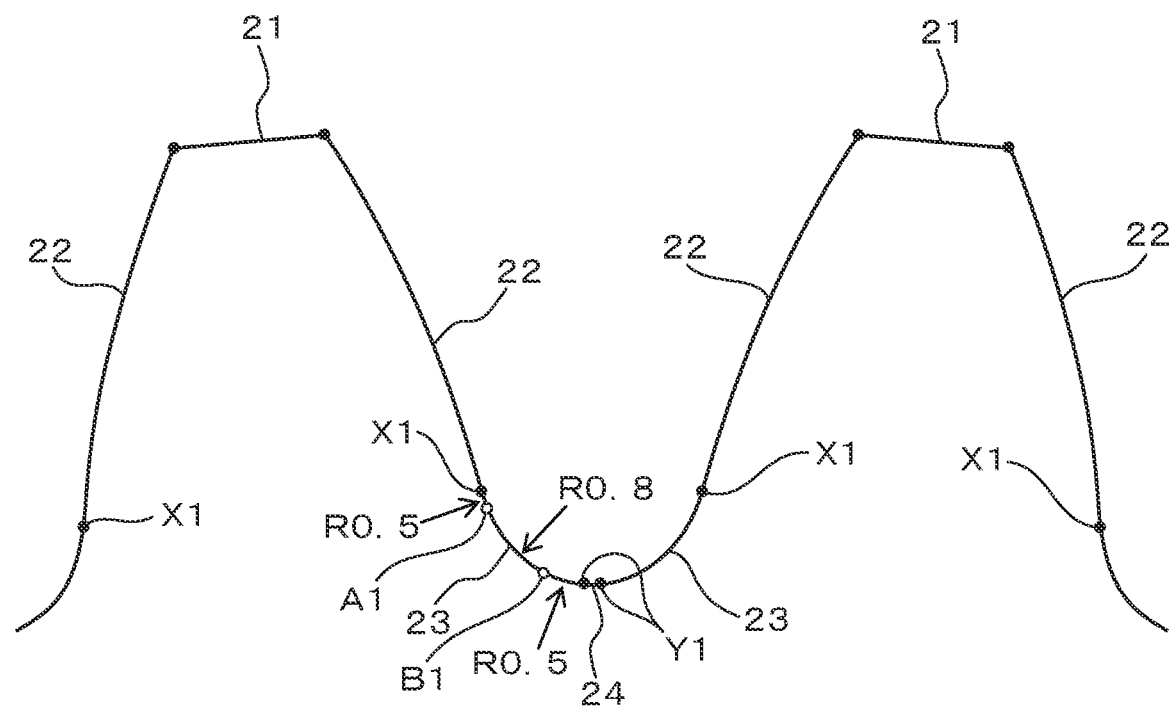
FIG. 2 is a view showing a tooth profile line segment of a high strength gear according to the present embodiment.
Figure 4A:
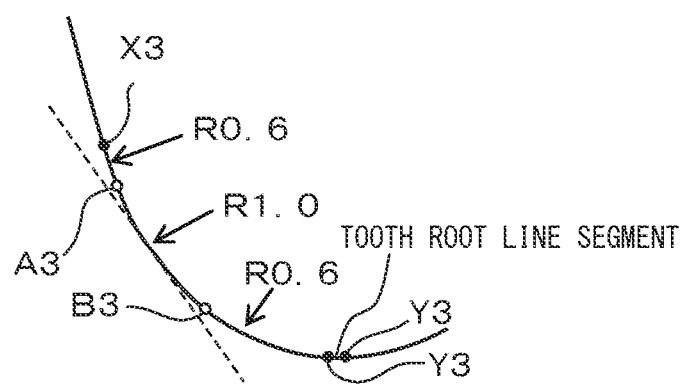
FIGS. 4A to 4C are views showing tooth profile line segments of different types of gears for comparison of the dedendum bending strength (invention example).
Figure 4B:
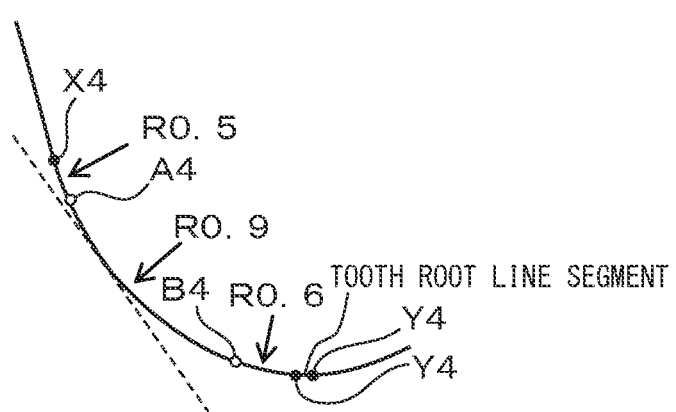
Figure 4C:
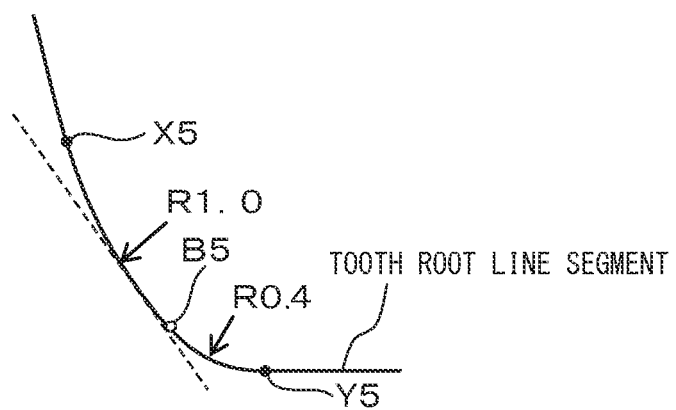
Figure 5A:
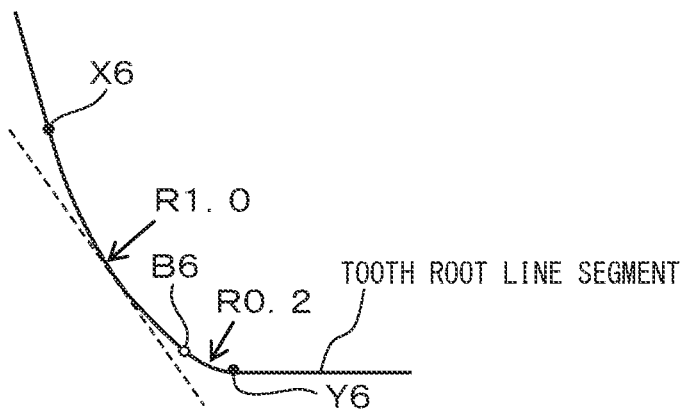
FIGS. 5A to 5C are views showing tooth profile line segments of different types of gears for comparison of the dedendum bending strength (comparative example).
Figure 5B:
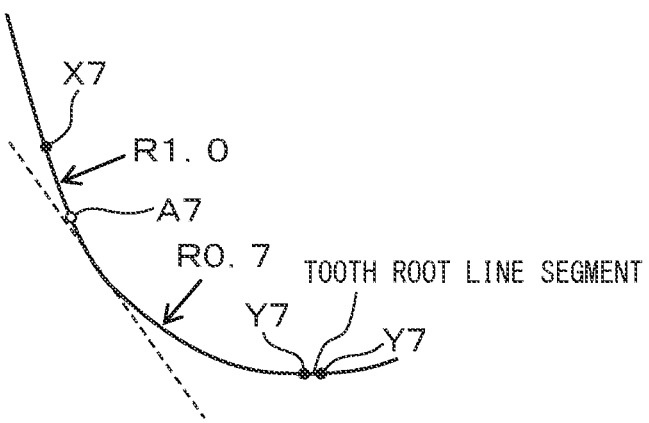
Figure 5C:
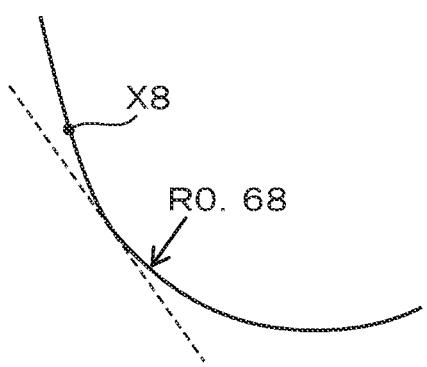

Below, an embodiment of the high strength gear according to the present invention will be explained in detail. Note that, the following embodiment does not limit the present invention. Further, the component elements of the embodiment include elements which a person skilled in the art could easily replace them with or are substantially the same. Furthermore, the different modes included in the embodiment can be freely combined within a range self evident to a person skilled in the art.

Findings of Inventors

In the Description, the profiles of the different parts of a high strength gear (addendum, tooth surface, dedendum, and tooth root) in a cross-section perpendicular to a tooth of the gear (below, sometimes simply referred to as the "cross-section") are defined as follows in the state with the tooth projecting upward. A "tooth surface line segment" means a line segment contacting another gear when meshing with the other gear and transmitting torque. In the case of an external gear, it is a line segment of an upward projection, while in the case of an internal gear, it is a line segment of a projection at the inside. An "addendum line segment" means the arc-shaped line segment connecting the top ends of the tooth surface line segments at the left and right of a tooth, projecting in the same direction as the tooth surface line segment, and comprised of part of the addendum circle. A "dedendum line segment" means a line segment connected to a tooth surface line segment at its root surface end. A "tooth root line segment" means the arc-shaped line segment with two ends connected to the ends of respectively different dedendum line segments of the opposite sides from the respective tooth surface line segments, projecting in the same direction as the above tooth surface line segments, and comprised of part of a tooth root circle.

To improve the dedendum bending strength of a gear, it is effective to reduce the maximum bending stress of the dedendum. Usually, in a cross-sectional view, the bending stress of the dedendum becomes maximum near the critical section position or decreases the further from the critical section position. However, even if away from the critical section position by a certain extent, if the radius of curvature is excessively small, extreme concentration of stress would occur and sometimes the dedendum bending stress would become maximum at that position. That is, assuming suitable control of the maximum bending strength, to improve the dedendum bending strength of a gear, it is effective to set a suitable radius of curvature corresponding to the distance from the critical section position.

Therefore, the inventors obtained the finding that if, by cross-sectional view, making maximum the radius of curvature at the critical section position with a high possibility of the dedendum bending stress becoming maximum, not making the radius of curvature change or making it decrease the further from the critical section position toward both the tooth surface and dedendum or providing a part with a smaller radius of curvature than the critical section position in the dedendum line segment and furthermore making the maximum radius of curvature at the dedendum line segment 3 times or less the minimum radius of curvature so that extreme concentration of stress does not occur (preferably 2 times or less), it is possible to make the maximum bending stress sufficiently small and in turn realize improvement of the dedendum bending strength.

Further, the inventors thought of making the line segment near the critical section position an involute curve gradually changing in curvature, then making the radius of curvature at the critical section position as large as possible so as to make the stress amplitude at the root surface region evener to a certain extent while reducing it overall. However, they discovered that if the line segment near the critical section position is an involute curve, if making the radius of curvature change by an extreme amount the further away from the critical section position, a position will appear where the stress amplitude becomes maximum at another point not the critical section position. Therefore, the inventors obtained the finding that by making the vicinity of the critical section position not an involute curve, but a region where the radius of curvature does not change, it is possible to further improve the dedendum bending strength without creating another point where the stress amplitude becomes maximum. Below, a high strength gear according to the present embodiment (representative example shown in FIG. 2) will be explained compared with a gear of a conventional type (representative example shown in FIG. 1).

Conventional Type

FIG. 1 is a view showing tooth profile line segments of a conventional spur gear fabricated by gear cutting (cross-sectional view). More specifically, in the illustrated example, the module was made 1.25, the number of teeth was made 36, the tooth profile was made a full depth tooth, the transfer coefficient was made 0, the torsional angle was made 0°, and the pressure angle was made 20°. The cutting edge R of the gear cutting tool was made 0.38 time the module within a range not having a detrimental effect on the meshing of teeth so that the dedendum could be made as rounded as possible. The tooth profile line segments shown in the figure are comprised of an arc-shaped addendum line segment 11 (projecting upward), involute curve tooth surface line segment 12 (projecting upward), trochoidal curve dedendum line segment 13 (projecting downward), and arc-shaped tooth root line segment 14 (projecting upward). Note that, the boundary point between the tooth surface line segment 12 and the dedendum line segment 13 is the first connecting point X0, while the boundary point between the dedendum line segment 13 and tooth root line segment 14 is the second connecting point Y0.

In the example shown in FIG. 1, for the dedendum line segment 13, the radius of curvature at a position near the first connecting point X0 was about 1.2 mm, the radius of curvature became smaller the further from that near position toward the tooth root line segment 14, and the radius of curvature at a position near the second connecting point Y0 was about 0.6 mm. Note that, the radius of curvature at the critical section position in the figure was about 0.7 mm.

Present Embodiment

FIG. 2 is a view showing the tooth profile of a spur gear comprising the high strength gear according to the present embodiment (cross-sectional view). The high strength gear shown in the figure has an addendum line segment 21, tooth surface line segment 22, dedendum line segment 23, and tooth root line segment 24 successively connected. The addendum line segment 21 and tooth surface line segment 22 shown in the figure are the same as the addendum line segment 11 and tooth surface line segment 12 shown in FIG. 1. The dedendum line segment 23 shown in FIG. 2 is a curve which is smoothly connected with the tooth surface line segment 22 at the first connecting point X1 and which is smoothly connected with the tooth root line segment 24 at the second connecting point Y1. Here, "smoothly connected with" means the tangents of two line segments are equal at the connecting point.

Further, in the example shown in FIG. 2, the radius of curvature is maximum at the critical section position determined by the Hofer's 30° tangent method. That is, in the example shown in FIG. 2, for the dedendum line segment 23, the radius of curvature at the critical section position is a maximum 0.8 mm.

Furthermore, in the example shown in FIG. 2, the radius of curvature from the critical section position to the boundary point of the tooth surface line segment 22 and the dedendum line segment 23, that is, the first connecting point X1 (region including the point A1) is constant or decreasing, while the radius of curvature from the critical section position to the boundary point of the dedendum line segment 23 and the tooth root line segment 24, that is, the second connecting point Y1 (region including the point B1) is constant or decreasing.

Furthermore, in the example shown in FIG. 2, in the dedendum line segment 23, there is a point with a radius of curvature smaller than the critical section position. In the dedendum line segment 23, the maximum radius of curvature is 3 times or less the minimum radius of curvature. That is, for the dedendum line segment 23, the radius of curvature at a position near the first connecting point X1 and the radius of curvature at a position near the second connecting point Y1 are minimums. Both are about 0.5 mm. For this reason, as explained above, since the radius of curvature at the critical section position is 0.8 mm (maximum), in the dedendum line segment 23, the maximum radius of curvature is 1.6 times (3 times or less) the minimum radius of curvature.

In addition, in the example shown in FIG. 2, while details are not shown, the critical section position is part of an arc. This arc extends to both sides of the critical section position.

In the high strength gear shown in FIG. 2 having the above such configuration, in a cross-sectional view, the radius of curvature at the critical section position with a high possibility of the dedendum bending stress becoming maximum is made maximum and the radius of curvature is made not to change or is made to decrease the further from the critical section position toward both the tooth surface and dedendum. Alternatively, a part where the radius of curvature is smaller than the critical section position is provided in the dedendum line segment. Furthermore, extreme stress concentration is prevented from occurring by making the maximum radius of curvature of the dedendum line segment 3 times or less the minimum radius of curvature (preferably 2 times or less). Further, the high strength gear shown in the figure has the vicinity of the critical section position made a region where the radius of curvature does not change. Therefore, according to the above high strength gear, a suitable radius of curvature is set corresponding to the distance from the critical section position and, further, the point where the stress amplitude becomes the maximum is made the critical section position, so it is possible to improve the dedendum bending strength.

Note that, for the tooth profile from the critical section position to the first connecting point X1 shown in FIG. 2 and the tooth profile from the critical section position to the second connecting point Y1 shown in FIG. 2, if the point including the critical section position is not the end point of an arc, other arcs may be formed at the two sides of that arc (radius of curvature not changed) or an involute curve (radius of curvature changed) may be formed. However, at the connecting point of an arc including the critical section position and another arc or involute curve, it is required that the tangents of the two curves match. By having the tangents of the two curves match, it is possible to suppress breakage at that point and, furthermore, possible to realize improvement of the dedendum bending strength.

Further, in the example shown in FIG. 2, preferably the arc containing the critical section position extends in the addendum line segment direction and the dedendum line segment direction based on the critical section position by the respective tooth depth direction dimensions of 0.05 time or more the module. Here, the "module" means the value of the pitch circle diameter of the gear divided by the number of teeth. It can be said that if the arc extends in two directions by 0.05 time or more the module, the dedendum bending stress will never become maximum at another point besides the critical section position.

Furthermore, the material of the gear shown in FIG. 2 may also be a ferrous alloy. Here, as a ferrous alloy, an alloy having iron as its main component and including other elements, for example, carbon steel, alloy steel, case hardened steel, steel for nitriding use, stainless steel, maraging steel, Invar, Kovar, sendust, Spiegeleisen, etc. may be mentioned.

Study by Finite Element Analysis Method

The inventors estimated the magnitude of the bending stress generated at the dedendum at the time of use of the gear (time of power transmission) by the finite element analysis method so as to study the effects of the dedendum profile on the dedendum bending strength. Note that the analysis conditions were made as follows: That is, a spur gear having each of the tooth profiles shown in FIG. 1 and FIG. 2 was fastened to stop rotation and force was applied to the vicinity of the tip of any one tooth. The position of application of the force was made on the line at which the surface of a cylindrical tube of a diameter of 46.5 mm having the same center axis as the center axis of the gear and the tooth surface intersected, while the direction of the force was made a direction vertical to the tooth surface. Note that, the applied force was made 35 kN with respect to a gear width of 100 mm.

As a result of finite element analysis, for a conventional gear shown in FIG. 1 fabricated by gear cutting, the maximum value of the maximum main stress generated at the dedendum was estimated at 502 MPa. As opposed to this, for the high strength gear according to the present embodiment shown in FIG. 2, that maximum value of the maximum main stress was estimated at 469 MPa. Therefore, for the high strength gear according to the present embodiment, it may be considered that since the radius of curvature near the critical section position was made the largest and there was no part with an extremely small radius of curvature, the maximum value of the maximum main stress was kept down.

Due to the above, according to the high strength gear according to the present embodiment, assuming suitable control of the maximum bending stress, when trying to improve the dedendum bending strength of the gear, it is possible to set a suitable radius of curvature in accordance with the distance from a critical section position and thereby keep down the maximum bending stress occurring at the dedendum at the time of power transmission and in turn realize higher strength of the gear.

EXAMPLES

As explained above, the high strength gear according to the present embodiment (representative example shown in FIG. 2) was verified as exhibiting the effect prescribed in the present application compared with a gear according to the prior type (representative example shown in FIG. 1). Below, these types will be compared in further detail. Note that the dedendum profile of the high strength gear according to the present embodiment is not limited to the example shown below.

As explained above, to study the effects of the dedendum profile on the dedendum bending strength, the magnitude of the bending stress generated at the dedendum at the time of gear use (time of power transmission) was estimated by finite element analysis. FIGS. 3A and 3B to FIGS. 5A to 5C are views (cross-sectional views) showing the line segments of the tooth profiles of various gears comparing the dedendum bending strength (FIGS. 3A and 3B: conventional examples, FIGS. 4A to 4C: invention examples, FIGS. 5A to 5C: comparative examples). Note that, the broken lines in these figures are all lines forming an angle of 30° with the centerline of tooth profile. The position where this line contacts a tooth surface (part shown by tooth surface line segment of figure) is the critical section position. Further, in FIGS. 3A and 3B to FIGS. 5A to 5C, the point X0 and the point X2 to the point X8 respectively show first connecting points, the point Y0 and the point Y2 to the point Y8 respectively show second connecting points, the point A3, the point A4, and the point A7 respectively show points included in the region from the critical section position to the first connecting points X3, X4, and X7, the point B2, the point B2', the point B3, the point B4, the point B5, and the point B6 respectively show points included in the regions from the critical section position to the second connecting points Y2, Y3, Y4, Y5, and Y6, and the point C2 shows a point at the critical section position.

The example shown in FIG. 3A (Conventional Example 1) is an example of fabrication by gear cutting (example shown in FIG. 1) in which the module was made 1.25, the number of teeth was made 36, the tooth profile was made a full depth tooth, the transfer coefficient was made 0, the torsional angle was made 0°, and the pressure angle was made 20° and in which the cutting edge R of the gear cutting tool was made 0.38 time the module within a range not having a detrimental effect on the meshing of teeth so that the roundness of the dedendum could be made as large as possible. Further, as explained above, at the dedendum line segment, the radius of curvature at a position near the first connecting point X0 was about 1.2 mm. The radius of curvature became smaller the further from that near position toward the tooth root line segment. The radius of curvature at a position near the second connecting point Y0 was about 0.6 mm. Note that, the radius of curvature at the critical section position in that figure was about 0.7 mm.

In the example shown in FIG. 3B (Conventional Example 2), the addendum line segment and tooth surface line segment are the same as the example shown in FIG. 3A, but the shape of the dedendum line segment differs. The span from the addendum line segment terminal end to the critical section position is an involute curve. The radius of curvature near the addendum line segment terminal end was about 0.7 mm. The radius of curvature became larger the further toward the critical section position, while the radius of curvature at the critical section position was 0.8 mm. The span from the critical section position to B2 was an involute curve. The radius of curvature became smaller the further from the critical section position toward B2. The radius of curvature near B2 was about 0.6 mm. The span from B2 to B2' was an arc, while the radius of curvature was 0.6 mm. The span from B2' to the second connecting point (tooth root line segment terminal end) Y2 was an involute curve. The radius of curvature became smaller the further from B2' toward the tooth root line segment terminal end. The radius of curvature near the tooth root line segment terminal end was about 0.3 mm.

The examples shown in FIGS. 4A to 4C and FIGS. 5A and 5B (Invention Examples 1 to 3 and Comparative Examples 1 and 2) had addendum line segments and tooth surface line segments the same as the example shown in FIG. 3A, but differed in shapes of the dedendum line segments. The example shown in FIG. 5C (Comparative Example 3) had an addendum line segment and tooth surface line segment the same as the example shown in FIG. 3A, but the end part of one (shown) tooth surface line segment (first connecting point X8) and the end part of another (not shown) tooth surface line segment were connected by an independent arc without going through the tooth root line segment so as to have the same tangents at the connecting points.

Next, the analysis conditions were made as follows: That is, a spur gear having each of the tooth profiles shown in FIGS. 3A and 3B to FIGS. 5A to 5C was fastened to stop rotation and force was applied to the vicinity of the tip of any one tooth. The position of application of the force was made on the line at which the surface of a cylindrical tube of a diameter of 46.5 mm having the same center axis as the center axis of the gear and the tooth surface intersected, while the direction of the force was made a direction vertical to the tooth surface. Envisioning the gear being made of steel, this was assumed to be an elastic body with a Young's modulus of 207 GPa and a Poisson's ratio of 0.3 and was analyzed as a plane strain state. Note that, the applied force was made 35 kN with respect to a gear width of 100 mm. Under such conditions, the maximum value of the maximum main stress (MPa) at the dedendum was estimated. From the results, the ratio of the maximum value of the maximum main stress at the dedendum with respect to the conventional examples was found. The above analysis conditions are shown in Table 1, while the results of analysis are shown in Table 2.

TABLE 1

|  | Radius of curvature at critical section position (mm) | Maximum radius of curvature (mm) | Minimum radius of curvature (mm) | Change of radius of curvature from first connecting point to second connecting point | Whether radius of curvature is maximum at critical section position? |
|---|---|---|---|---|---|
| Conv. Ex. 1 (FIG. 3A) | R0.7 | R1.2 | R0.6 | Continuously decreasing from R1.2 to R0.6 | No |
| Conv. Ex. 2 (FIG. 3B) | R0.8 | R0.8 | R0.3 | Continuously increasing from R0.7 to R0.8 →continuously decreasing from R0.8 to R0.6 → continuously decreasing from R0.6 to R0.3 | Yes |
| Inv. Ex. 1 (FIG. 4A) | R1.0 | R1.0 | R0.6 | R0.6 →R1.0→ R0.6 | Yes |
| Inv. Ex. 2 (FIG. 4B) | R0.9 | R0.9 | R0.5 | R0.5 →R0.9→ R0.6 | Yes |
| Inv. Ex. 3 (FIG. 4C) | R1.0 | R1.0 | R0.4 | R1.0 → R0.4 | Yes |
| Comp. Ex. 1 (FIG. 5A) | R1.0 | R1.0 | R0.2 | R1.0 → R0.2 | Yes |
| Comp. Ex. 2 (FIG. 5B) | R0.7 | R1.0 | R0.7 | R1.0 → R0.7 | No |
| Comp. Ex. 3 (FIG. 5C) | R0.68 | R0.68 | R0.68 | Constant at R0.68 | Yes |

|  | Whether maximum radius of curvature is 3 times or less minimum radius of curvature? | Whether there is change in radius of curvature? | Whether critical section position is part of arc and arc extends to both sides of critical section position? | Minimum extended length at tooth depth direction dimension of arc at left column with respect to module based on critical section position (X) |
|---|---|---|---|---|
| Conv. Ex. 1 (FIG. 3A) | Yes | Yes | No |  |
| Conv. Ex. 2 (FIG. 3B) | Yes | Yes | No |  |
| Inv. Ex. 1 (FIG. 4A) | Yes | Yes | Yes | 0.119 |
| Inv. Ex. 2 (FIG. 4B) | Yes | Yes | Yes | 0.073 |
| Inv. Ex. 3 (FIG. 4C) | Yes | Yes | Yes | 0.138 |
| Comp. Ex. 1 (FIG. 5A) | No | Yes | Yes | 0.194 |
| Comp. Ex. 2 (FIG. 5B) | Yes | Yes | Yes | 0.117 |
| Comp. Ex. 3 (FIG. 5C) | Yes | No | Yes | 0.210 |

TABLE 2

|  | Maximum value of maximum main stress at dedendum (MPa) | Ratio with conventional example for maximum value of maximum main stress at dedendum |
|---|---|---|
| Conv. Ex. 1 (FIG. 3A) | 502 | 1.00 |
| Conv. Ex. 2 (FIG. 3B) | 488 | 0.97 |
| Inv. Ex. 1 (FIG. 4A) | 459 | 0.91 |
| Inv. Ex. 2 (FIG. 4B) | 463 | 0.92 |
| Inv. Ex. 3 (FIG. 4C) | 472 | 0.94 |
| Comp. Ex. 1 (FIG. 5A) | 551 | 1.10 |
| Comp. Ex. 2 (FIG. 5B) | 507 | 1.01 |
| Comp. Ex. 3 (FIG. 5C) | 524 | 1.04 |

As shown in Tables 1 and 2, in Invention Examples 1 to 3 (FIGS. 4A to 4C), in each case, the radius of curvature at the critical section position is made maximum and the radius of curvature the further from the critical section position to both the tooth surface and dedendum is either left unchanged or made to decrease, there is made a part inside the dedendum line segment where the radius of curvature is smaller than the critical section position, and, furthermore, extreme concentration of stress is prevented from occurring by making the maximum radius of curvature at the dedendum line segment 3 times or less the minimum radius of curvature. Further, in Invention Examples 1 to 3, the vicinity of the critical section position is made the region where the radius of curvature does not change. Therefore, in Invention Examples 1 to 3, a suitable radius of curvature corresponding to the distance from the critical section position is set and, further, the point where the stress amplitude becomes maximum is made the critical section position, so it is learned that the maximum value of the maximum main stress is greatly decreased from the Conventional Examples 1 and 2 and improvement of the dedendum bending strength is realized.

As opposed to this, in Comparative Examples 1 to 3 (FIGS. 5A to 5C), either the radius of curvature at the critical section position being maximum, the maximum radius of curvature being 3 times or less the minimum radius of curvature, and the radius of curvature changing is not satisfied, so the gear does not have the shape prescribed in the present application. For this reason, in Comparative Examples 1 to 3, it is learned that no improvement of the dedendum bending strength can be realized without the maximum value of the maximum main stress being greatly decreased from the Conventional Examples 1 and 2.

From the above results, according to a gear having a predetermined dedendum profile of the present application, the action of suppressing dedendum bending stress was verified. Note that, the present invention can be broadly applied to not only a spur gear, but also a helical gear, internal gear, bevel gear, worm gear, hypoid gear, or other dedendum profile. Further, the tooth surface of a gear of the present invention is not limited to an involute curve and may be any curve. Furthermore, the material of the gear of the present invention may be any material. For example, a metal such as a ferrous alloy or a plastic can be used.

REFERENCE SIGNS LIST 11, 21. addendum line segment
12, 22. tooth surface line segment
13, 23. dedendum line segment
14, 24. tooth root line segment
A1, A3, A4, A7. points included in region from critical section position to first connecting point
B1, B2, B2', B3, B4, B5, B6. points included in region from critical section position to second connecting point
C2. point at critical section position
X0 to X8. first connecting point
Y0 to Y7. second connecting point

The invention claimed is:

1. A high strength gear having, in cross-sectional view, a tooth profile of an addendum line segment, a tooth surface line segment, a dedendum line segment, and a tooth root line segment successively connected, wherein a maximum radius of curvature is at a critical section position, the critical section position being determined by the Hofer's 30° tangent method, the critical section position being a point in the dedendum line segment, a radius of curvature from said critical section position to a first connecting point of a boundary point of said tooth surface line segment and said dedendum line segment is constant or decreases and a radius of curvature from said critical section position to a second connecting point of a boundary point of said dedendum line segment and said tooth root line segment is constant or decreases, in said dedendum line segment, there is a point where the radius of curvature is smaller than said critical section position, in said dedendum line segment, a maximum radius of curvature is 3 times or less a minimum radius of curvature, and said critical section position is positioned on an arc having a constant radius of curvature and said critical section position is not an endpoint of the arc.

2. The high strength gear according to claim 1, wherein said arc extends in said addendum line segment direction and said dedendum line segment direction based on said critical section position by a tooth depth direction dimension of 0.05 time or more of a module.

3. The high strength gear according to claim 2, comprised of a ferrous alloy.

4. The high strength gear according to claim 1, comprised of a ferrous alloy.

* * * * *